US007055883B2

(12) United States Patent
Tokutomi et al.

(10) Patent No.: US 7,055,883 B2
(45) Date of Patent: Jun. 6, 2006

(54) OVERHEAD CONSOLE ASSEMBLY

(75) Inventors: Yasuyuki Tokutomi, Wako (JP); Masafumi Kanemori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 10/997,095

(22) Filed: Nov. 9, 2004

(65) Prior Publication Data
US 2005/0134073 A1    Jun. 23, 2005

(30) Foreign Application Priority Data
Dec. 22, 2003    (JP)    ............................. 2003-425436

(51) Int. Cl.
*B60N 3/12*    (2006.01)

(52) U.S. Cl. .................................... 296/37.8; 296/37.7

(58) Field of Classification Search ............... 296/37.8, 296/37.7, 1.11; 359/872, 196, 212, 216
See application file for complete search history.

(56) References Cited

U.S. PATENT DOCUMENTS

| 4,469,365 | A | * | 9/1984 | Marcus et al. .............. 296/37.8 |
| 4,867,498 | A | * | 9/1989 | Delphia et al. ............. 296/37.8 |
| 5,040,990 | A | * | 8/1991 | Suman et al. .............. 296/37.7 |
| 5,050,922 | A | * | 9/1991 | Falcoff ..................... 296/37.8 |
| 5,154,617 | A | * | 10/1992 | Suman et al. .............. 296/37.7 |
| 5,388,880 | A | * | 2/1995 | Kinane ....................... 296/37.8 |
| 5,522,638 | A | * | 6/1996 | Falcoff et al. ............. 296/37.8 |
| 5,775,761 | A | * | 7/1998 | Asami et al. .............. 296/37.8 |
| 5,822,023 | A | * | 10/1998 | Suman et al. ................ 348/837 |
| 6,062,623 | A | * | 5/2000 | Lemmen ..................... 296/37.8 |
| 6,125,030 | A | * | 9/2000 | Mola et al. ................. 296/37.8 |
| 6,126,221 | A | * | 10/2000 | Kern ......................... 296/37.8 |
| 6,135,528 | A | * | 10/2000 | Sobieski et al. ........... 296/37.8 |
| 6,234,570 | B1 | * | 5/2001 | Quinno et al. ............. 296/37.8 |
| 6,619,716 | B1 | * | 9/2003 | Sturt ......................... 296/37.8 |
| 6,690,803 | B1 | * | 2/2004 | Dykstra ....................... 381/86 |
| 6,722,719 | B1 | * | 4/2004 | Sturt ......................... 296/37.8 |
| 6,817,643 | B1 | * | 11/2004 | Donovan et al. ........... 296/37.7 |
| 6,957,839 | B1 | * | 10/2005 | Tiesler et al. .............. 296/37.8 |
| D512,973 | S | * | 12/2005 | Schedivy ................... D14/132 |
| 6,971,699 | B1 | * | 12/2005 | Isaacson .................... 296/37.8 |

FOREIGN PATENT DOCUMENTS

JP    7-8096    2/1985

\* cited by examiner

*Primary Examiner*—Kiran B. Patel
(74) *Attorney, Agent, or Firm*—Hamre, Schumann, Mueller & Larson, P.C.

(57) ABSTRACT

An overhead console assembly includes: a storage member positioned at a front of an interior roof within a vehicle compartment and having an opening which faces downwards; a lid member rotatably supported by the storage member for opening and closing the opening of the storage member so that a rear side thereof appears from and retracts into the storage member; a mirror provided on the lid member at a position where the rear side of the lid member appears to view; and retaining means retaining the lid member in a position halfway through the rotation of the lid member where the mirror reflects view of rear seats in the vehicle compartment.

4 Claims, 7 Drawing Sheets

FIG. 6
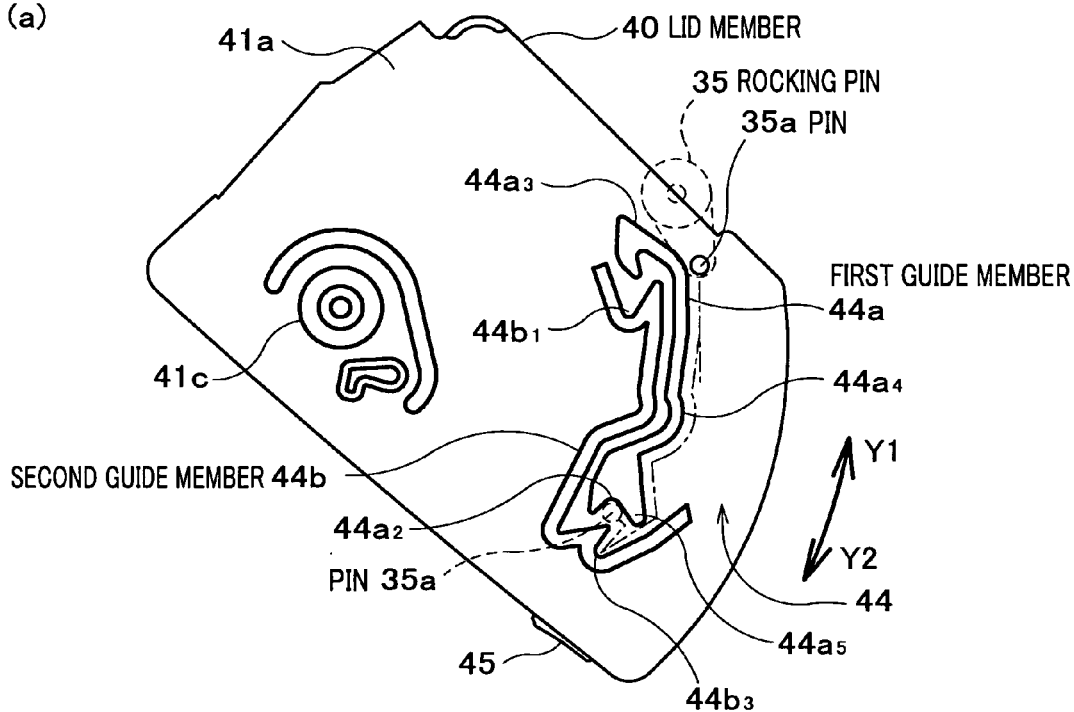
(a)
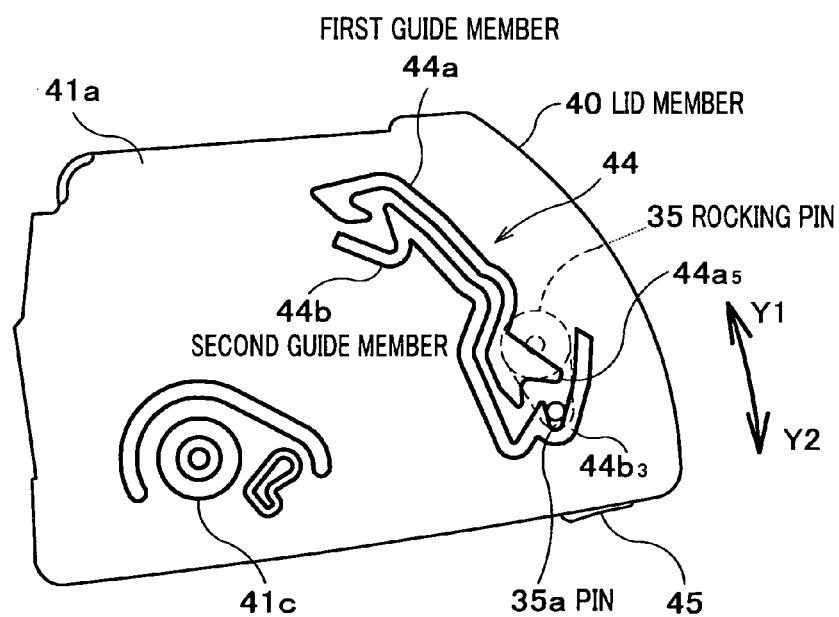
(b)

FIG.7
(a)
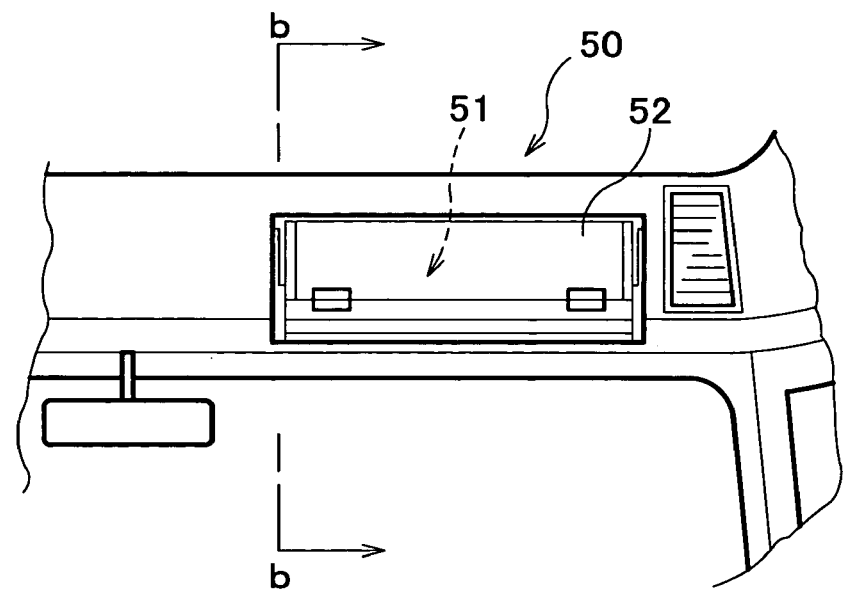
(b)
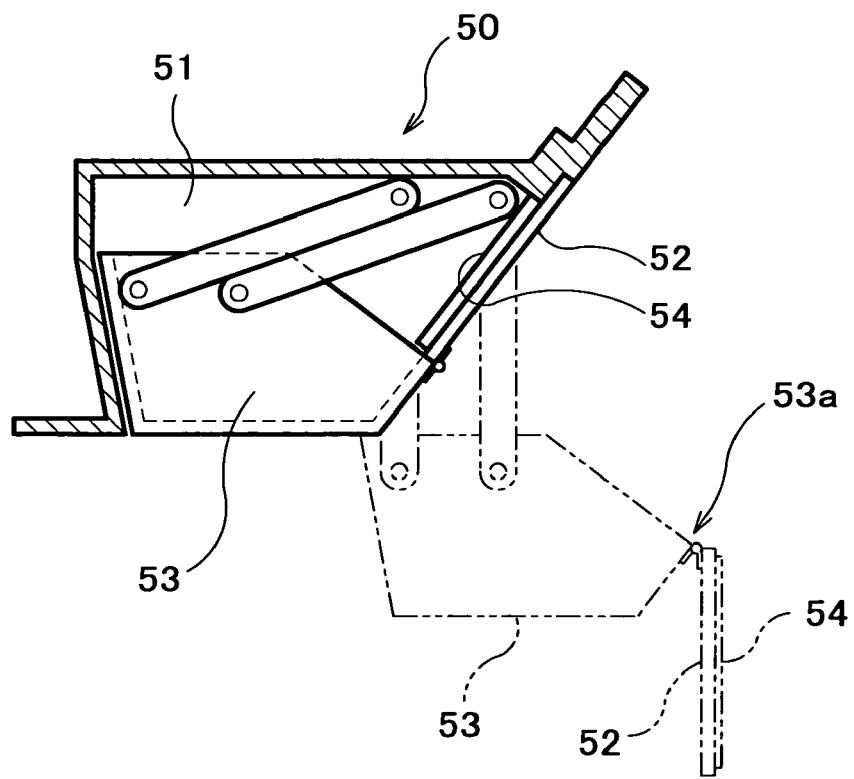

OVERHEAD CONSOLE ASSEMBLY

BACKGROUND OF THE INVENTION

The present invention relates to overhead console assemblies mounted on an interior roof (ceiling) within a vehicle compartment of an automobile and the like.

Overhead console assemblies are conventionally provided for wagon type vehicles in which the interior roof of the vehicle compartment is formed higher. These overhead console assemblies are equipped with a retractable storage member for stowing various small articles at a front part of the interior roof.

At a front part of the interior roof or at an upper center of the front window, there is provided a rear view mirror for viewing the area behind the vehicle. Rear view mirror is usually positioned to enable the driver to view the rear of the vehicle, and this makes is impossible for the driver to also view the rear seats in the vehicle compartment simultaneously.

For this reason, installation of a mirror has been considered such that the driver can view the rear seats from the driver seat. However, the installation of the mirror only for viewing the rear seats requires a further installation space and ends in impaired space efficiency. In view of this, several considerations have been made to mount a mirror on an overhead console assembly.

For example, Registered Utility Model No. 2590842 (Paragraphs [0008] to [0018] and FIGS. 1 to 5) discloses a conventional overhead console assembly to which is mounted a mirror. FIG. 7 shows the conventional overhead console assembly, in which (a) is a front view and (b) is a sectional view taken along the line b—b of (a). This overhead console assembly 50 includes a storage space 51 (at one side of the vehicle compartment) positioned above the driver seat (not shown) and a lid member 52 for covering the storage space 51, and opening the lid member 52 to pull out a console box 53 makes the console box 53 available for use. Further, opening the lid member 52 makes a mirror 54 which is attached to the reverse side of the lid member 52 dangle from the rear edge 53a of the console box 53, so that the mirror 54 is available for use.

This type of conventional overhead console assembly 50, however, adopts a structure in which the mirror 54 is dangled from the rear edge 53a of the console box 53, and this structure, when the driver is going to view the rear seats in the mirror 54, requires the driver to perform complicated operations such as tilting and adjusting the mirror 54 by hand.

With the foregoing drawback of the prior art in view, the present invention seeks to provide an overhead console assembly which employs a mirror to view the rear seats and which does not require any complicated operations.

SUMMARY OF THE INVENTION

It is an aspect of the present invention to provide an overhead console assembly including: a storage member positioned at a front of an interior roof within a vehicle compartment and having an opening which faces downwards; a lid member rotatably supported by the storage member for opening and closing the opening of the storage member so that a rear side thereof appears from and retracts into the storage member; a mirror provided on the lid member at a position where the rear side of the lid member appears to view; and a retaining means retaining the lid member in a position halfway through the rotation of the lid member where the mirror reflects view of rear seats in the vehicle compartment.

It is also an aspect of the present invention to provide an overhead console assembly including: a storage member positioned at a front of an interior roof within a vehicle compartment and having an storage space which faces downwards and into which small articles can be stowed; a lid member having a rearwall and rotatably supported by the storage member such that the rear wall can be retracted when the lidmember closes the storage space of the storage member, and the rear wall can be exposed to view when the lid member is open; a mirror mounted on the rear wall of the lid member; and retaining means retaining the lid member at least in a closed position where the lid member closes the storage space, a half-open position where the mirror is exposed to view for reflecting to a driver to a view of rear seats, and a full open position where the lid member is fully open to stow small articles.

According to the above overhead console assemblies, the lid member is constructed such that the mirror can be retained by the retaining means in a position halfway through the rotation of the lid member where the mirror reflects view of the rear seats in the vehicle compartment. Therefore, opening and retaining the lid member to this position allows the mirror to reflect view of the rear seats in the vehicle compartment without any complicated operations required by the conventional overhead console assembly.

Such an overhead console assemblies may preferably be arranged at a front part of the interior roof within the vehicle compartment and at the mid position along the vehicle width direction. With this arrangement of the overhead console assembly, it is possible to view the whole of the rear seats.

In the aforementioned overhead console assemblies, the mirror may be a convex mirror.

According to these overhead console assemblies, the mirror provided on the lid member is a convex mirror, which allows a wide range of view of the rear seats. Providing a convex mirror for the overhead console assembly improves its visibility and utility.

Other features and advantages of the present invention will be apparent from the following description.

BRIEF DESCRIPTION OF THE DRAWINGS

The aspects of the present invention will become more apparent by describing in detail illustrative, non-limiting embodiments thereof with reference to the accompanying drawings, in which:

FIG. 6 shows views, in which both (a) and (b) explain a state where the lid member is being closed; and FIG. 7 shows explanatory views illustrating a conventional overhead console assembly, in which (a) is a front view, and (b) is a sectional view taken along the line b—b of (a).

DETAILED DESCRIPTION OF THE INVENTION

With reference to the accompanying drawings, an overhead console assembly according to one exemplary embodiment of the present invention will be described below. In the following descriptions, terms "front" and "rear" are referred to as in the state where the overhead console assembly is mounted on an interior roof within a vehicle compartment of an automobile.

Figure 1:
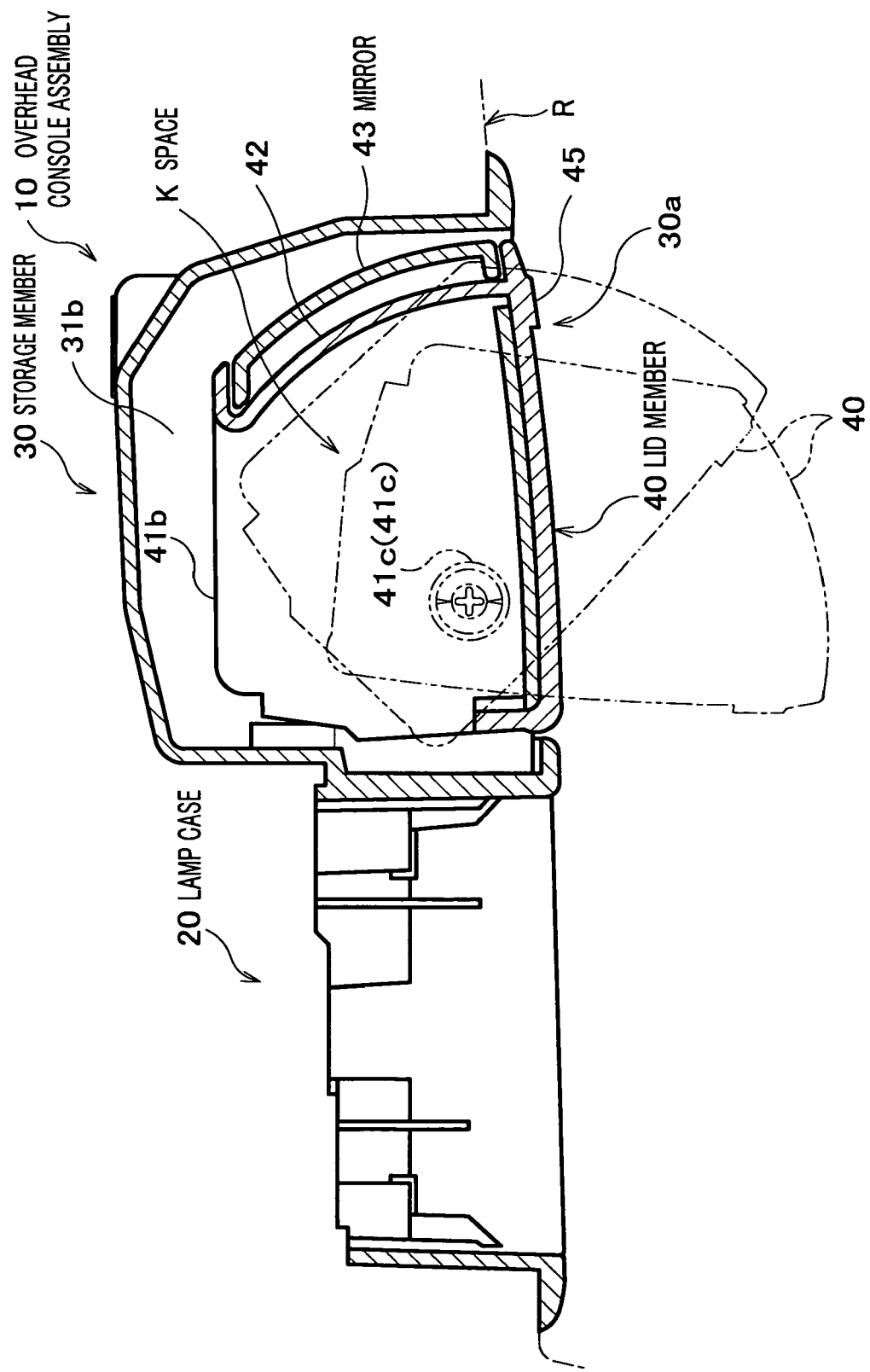
FIG. 1 is a vertical sectional view of an overhead console assembly according to the present invention.
Figure 2:
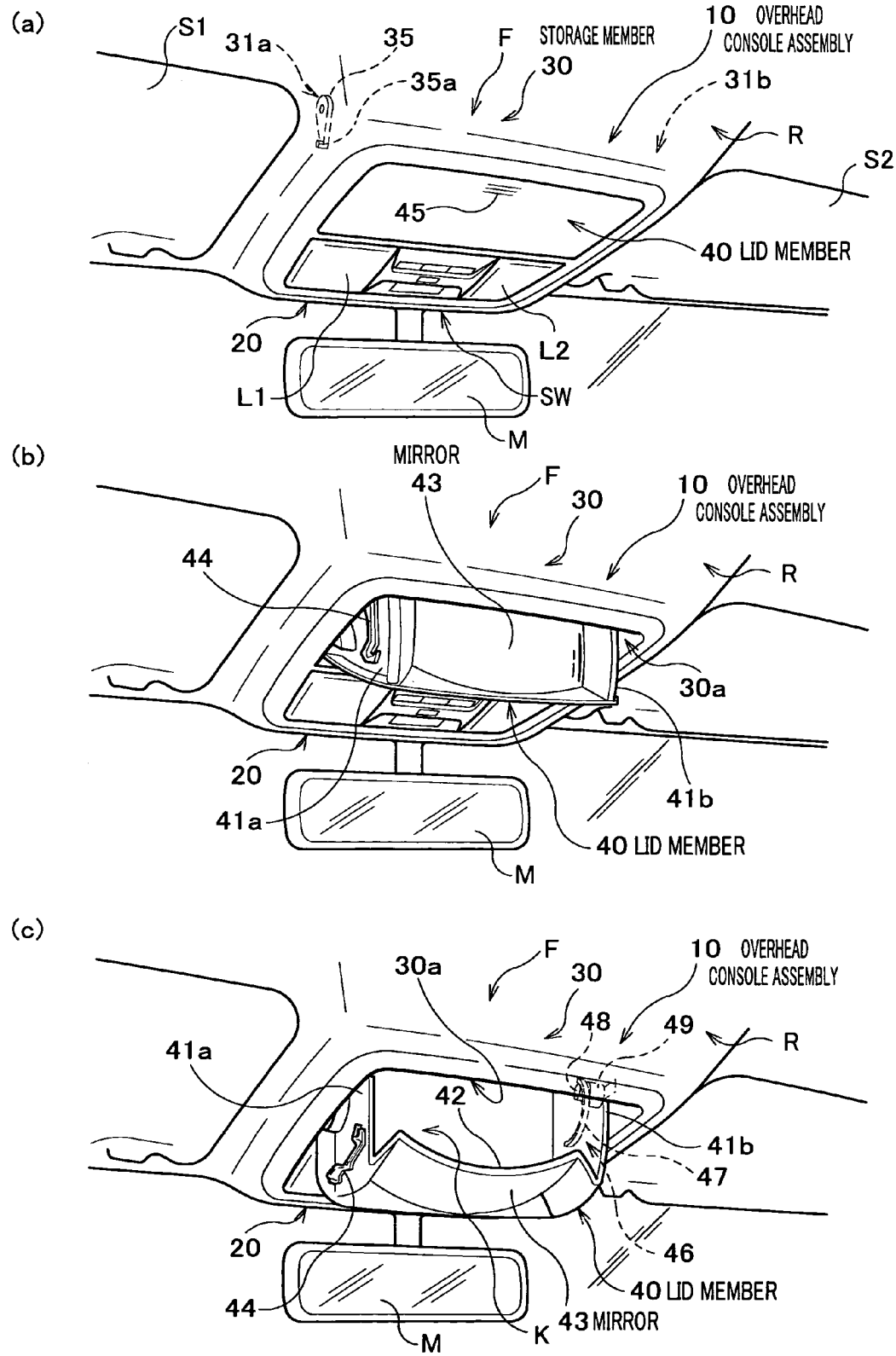
FIG. 2 shows a series of perspective views of the overhead console assembly as it is looked up diagonally from a lower position, in which (a) shows a state where a lid member is closed, (b) shows a state where a mirror is exposed to view, and (c) shows a state where the lid member is fully open.

As shown in FIG. 1, the overhead console assembly 10 includes a lamp case 20 positioned at a front part thereof, and a storage member 30 positioned at a rear part thereof. As shown in FIG. 2(a), the overhead console assembly 10 is arranged at the center of the front part F of the interior roof R within the vehicle compartment. In other words, the overhead console assembly 10 is arranged at the center of the front part F in such a manner sandwiched between left and right sun visors S1, S2. A rear view mirror (interior mirror) M is fixed, for example, to the front window and is arranged at the front of the overhead console assembly 10.

In the lamp case 20, left and right map lamps L1, L2 which partially illuminate the front seats (not shown) and switches SW are accommodated (not shown in FIG. 1).

As seen in FIG. 1, the storage member 30 is a box-like container having an opening (storage space) 30a at its lower part, and the size of which is adjusted to be accommodated in the interior roof (ceiling) R. At the lower part of the storage member 30 is provided a lid member 40 for opening and closing the opening 30a of the storage member 30.

As seen in FIGS. 1 and 2(c), the lid member 40 has side walls 41a, 41b (FIG. 1 shows only one side wall) and a rear wall (bucket member) 42, so that small articles (not shown) are stowed in the space K surrounded by the side walls 41a, 41b and the bucket member 42.

A mirror 43 for viewing rear seats is mounted on the lid member 40 at the rear side of the bucket member 42. In this exemplary embodiment, a convex mirror bulging toward the rear side of the vehicle compartment is employed as the mirror 43.

Figure 3:
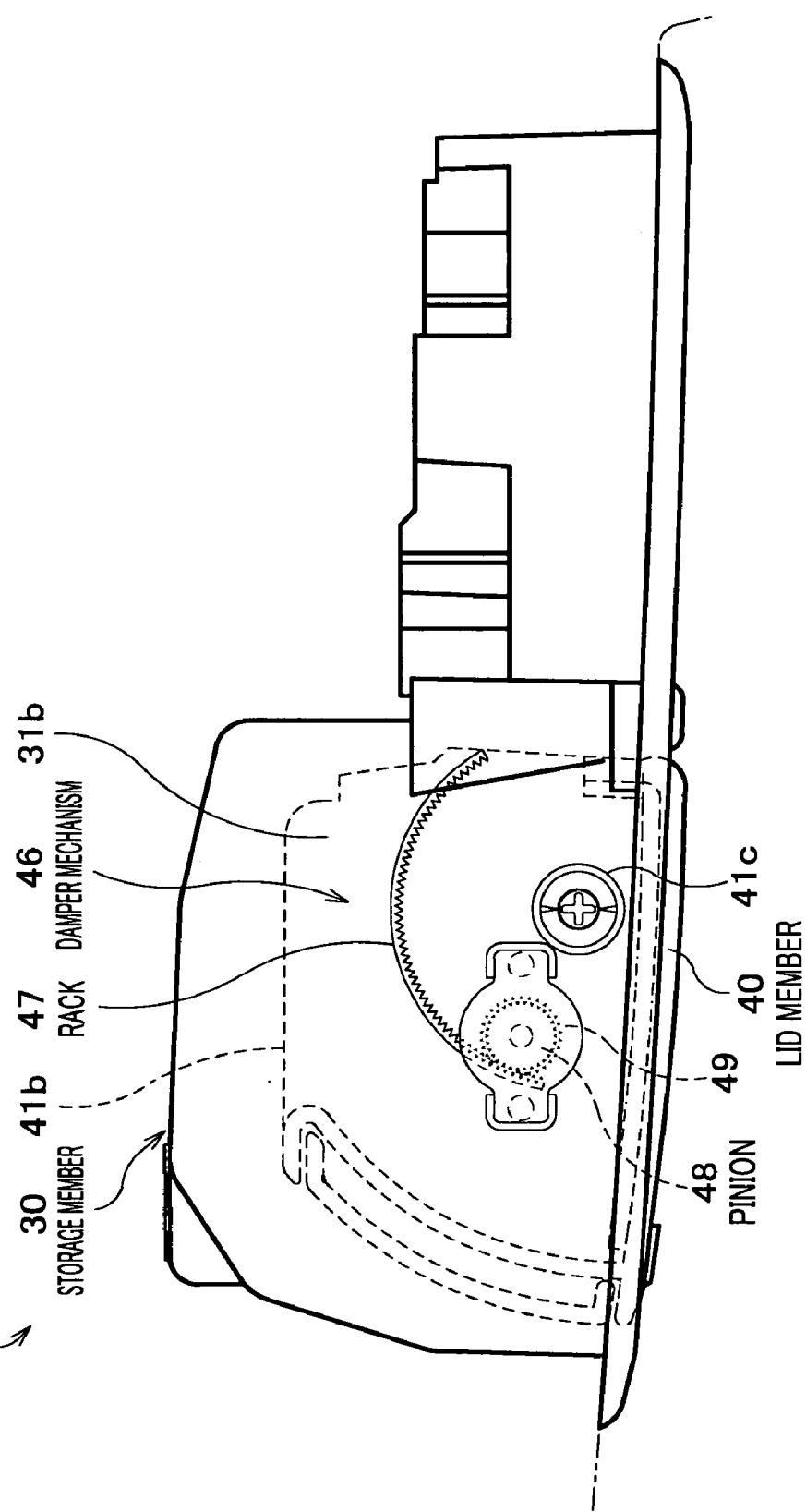
FIG. 3 is a partial cutaway side view explaining a damper mechanism.

As shown in FIG. 1, the lid member 40 is rotatably supported by the side walls 31a, 31b (only one side wall is shown in the figure) of the storage member 30 through supporting axles 41c, 41c each provided at the corresponding side walls 41a, 41b, such that the rear wall 42 of the lid member 40 is exposed to view when it is pulled out from the storage member 30. A known spring mechanism (not shown) that urges the lid member 40 toward the open direction is provided at the side wall 41a of the lid member 40 (FIG. 2(c)) and around the supporting axle 41c. The urging force of the spring member of this spring mechanism allows the lid member 40 to rotate toward the open direction. A damper mechanism 46 is provided at the opposite side wall 41b as best seen in FIG. 3. The damper mechanism 46 prevents the spring mechanism from abruptly opening the lid member 40. The damper mechanism 46 consists of an arcuate rack 47 provided on the side wall 41b of the lid member 40, and a viscosity member 49 provided on the side wall 31b of the storage member 30 facing to the side wall 41b and having a pinion 48. The end of the rotation axle of the pinion 48 is inserted into and mounted to the viscosity member 49. A plurality of blades (not shown) are provided around the end of the rotation axle so as to provide resistance upon rotation of the pinion 48. High viscosity fluid such as high viscosity oil is charged in the viscosity member 49. The damper mechanism 46 relieves the rotation force applied by the spring mechanism, thereby enabling the lid member 40 to rotate slowly in the open direction.

The lid member 40 is provided with a guide mechanism which functions as retaining means to be described later, and by the action of the guide mechanism the lid member 40 can be opened in two stages.

Figure 4:
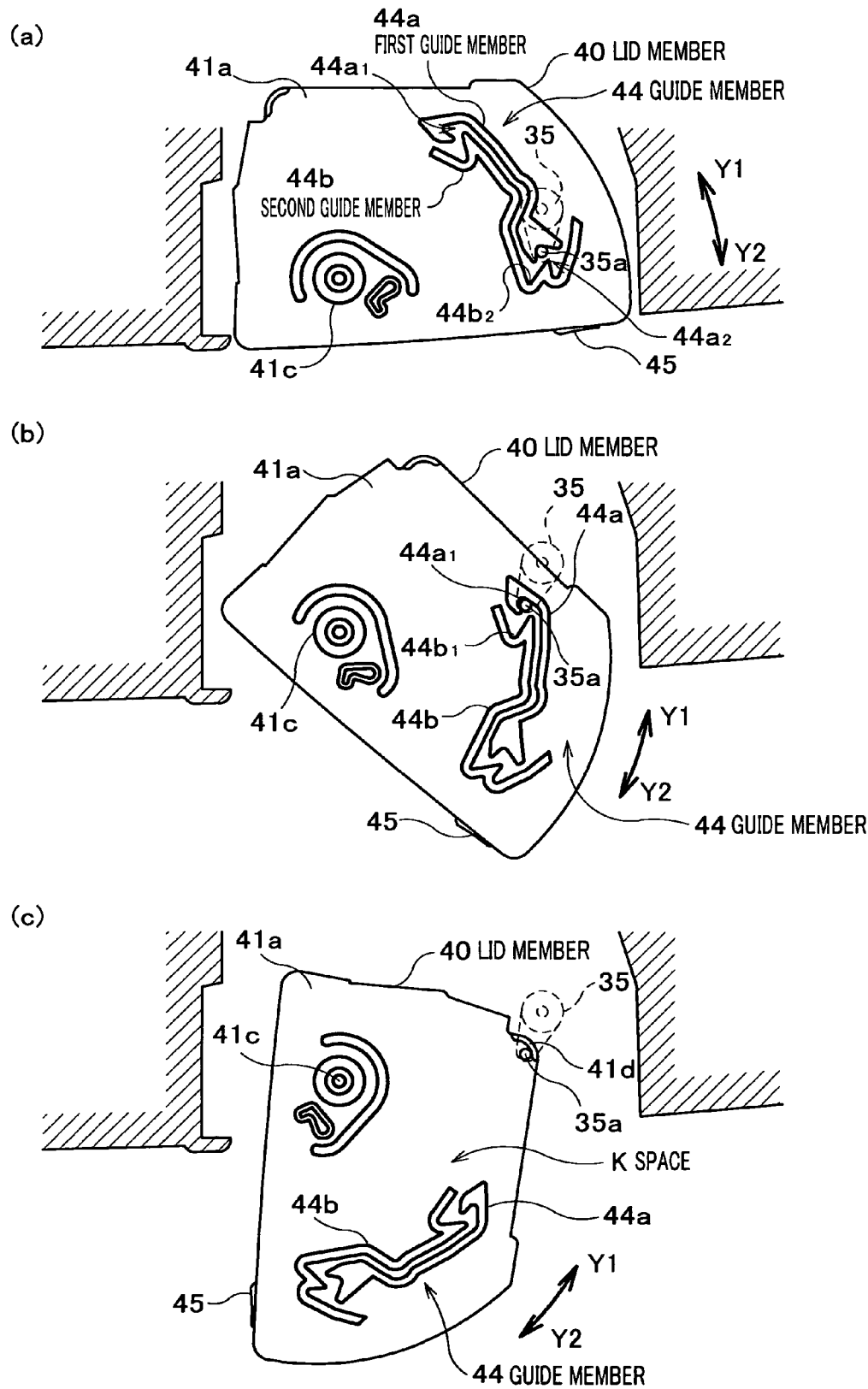
FIG. 4 shows a series of views schematically explaining the rotation of the lid member by means of a guide mechanism, in which (a) shows a state where the lid member is closed, (b) shows a state where the lid member is half open, and (c) shows a state where the lid member is fully open.

As best seen in FIGS. 4(a) to 4(c), the guide mechanism consists of a guide member 44 projecting from the outer side of the side wall 41a, and a rocking pin 35 (shown by broken line) provided on the storage member 30 (see FIG. 2(a)) at a position facing the guide member 44.

The guide member 44 consists of a first guide member 44a and a second guide member 44b. The first guide member 44a is provided with a lower hook $44a_2$ for retaining the lid member 40 in the closed position as shown in FIG. 4(a) and an upper hook $44a_1$ for retaining the lid member 40 in the half-open position as shown in FIG. 4(b).

As shown in FIG. 2(a), the rocking pin 35 is fixed to the side wall 31a (facing to the guide member 44) of the storage member 30. When the lid member 40 rotates, a pin 35a positioned downward of the rocking pin 35 traces along the guide member 44 while retaining engagement with the guide member 44. The rotation of the lid member 40 is therefore restricted.

Figure 5:
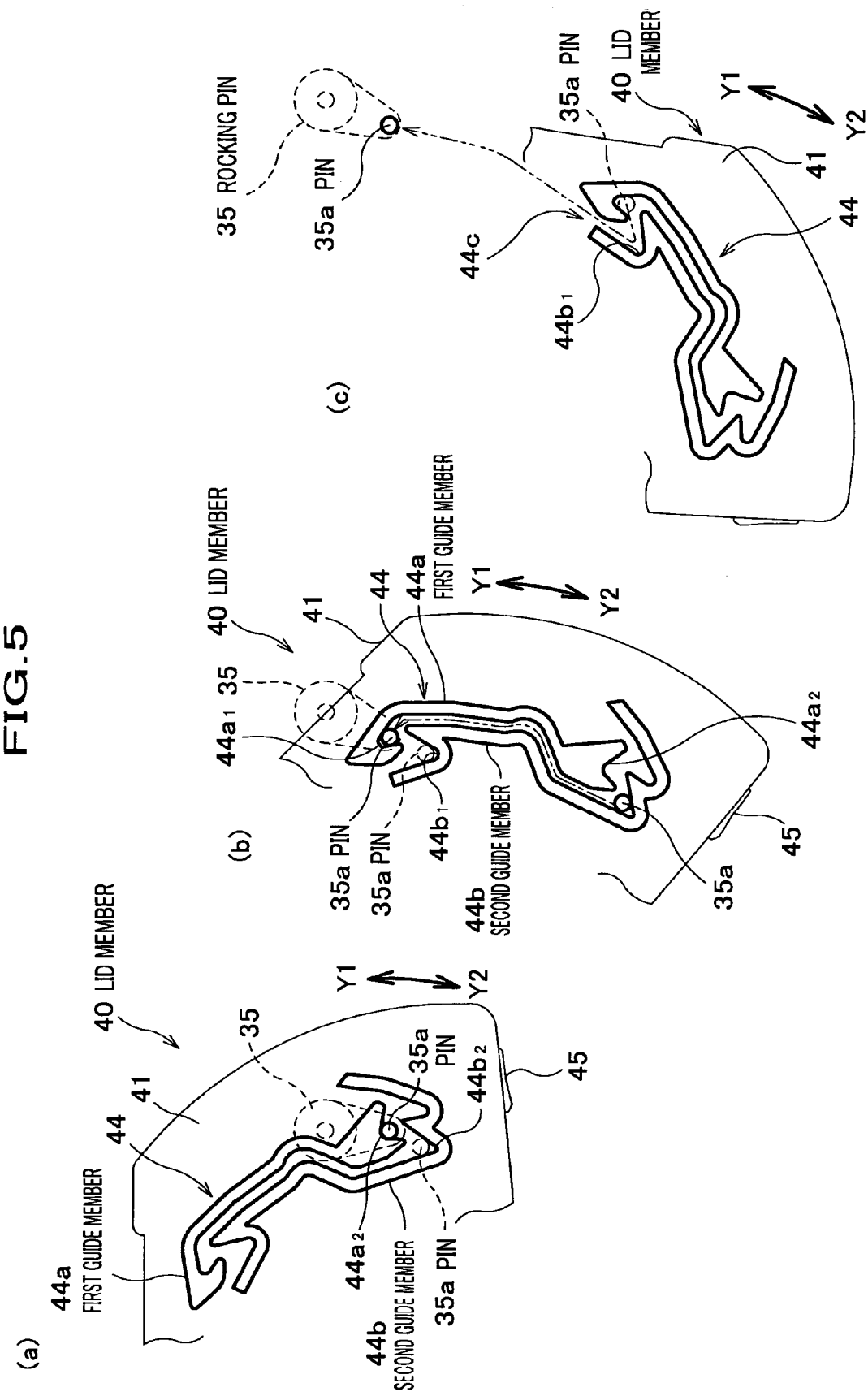
FIG. 5 shows a series of views explaining engagement relations between a guide member 44 and a rocking pin 35, in which (a) shows a state where the lid member is closed, (b) shows a state where the lid member is half open, and (c) shows a state where the lid member is fully open.

With reference to FIGS. 5(a) to 5(c), the rotating movement of the lid member 40 by means of the guide mechanism will be described. FIG. 5 shows a series of views explaining engagement relations (positional relations) between the guide member 44 and the rocking pin 35, in which (a) schematically shows a state where the lid member is closed, (b) schematically shows a state where the lid member is half open, and (c) schematically shows a state where the lid member is fully open. The engagement relations (positional relations) between the guide member 44 and the rocking pin 35 shown in FIGS. 5(a) to 5(c) correspond to those shown in FIGS. 4(a) to 4(c), respectively.

As best seen in FIGS. 4(a) and 5(a), in the state where the lid member 40 is closed, the pin 35a of the rocking pin 35 engages with the lower hook $44a_2$ formed on the first guide member 44a of the guide member 44, so that the lid member 40 is retained in the retracted position to close the storage member 30. In this state, because the spring mechanism urges the lid member 40 toward the open direction, the pin 35a of the rocking pin 35 engages with the lower hook $44a_2$ of the first guide member 44a with relatively strong engagement force so as not to come off easily.

When opening the lid member 40, the driver or a passenger pushes the press portion 45 formed on the rear of the bottom surface of the lid member 40 by his finger. By pressing the press portion 45 with finger the lid member 40 rotates in the direction Y1 of FIG. 4(a) where the lid member 40 is retracted into the storage member 30, and the pin 35a of the rotating pin 35 comes off from the lower hook $44a_2$ of the first guide member 44a as shown in FIG. 5(a) and enters into the lower recess $44b_2$ of the second guide member 44b as shown by the broken line in FIG. 5(a). The engagement between the lower hook $44a_2$ and the pin 35a is thereby disengaged.

When the driver or the passenger releases the finger from the press portion 45, the lid member 40 rotates (moves downward) in the direction Y2 of FIGS. 4(a) and 4(b) by the urging force of the spring mechanism. During this event, as shown in FIG. 5(b), the pin 35a of the rocking pin 35 traces upwardly from the lower recess $44b_2$ of the second guide member 44b along and between the first and second guide members 44a, 44b and comes into engagement with the upper hook $44a_1$ of the first guide member 44a. The locus of the pin 35 is shown by the chain double-dashed line. The lid member 40 then stops the rotating movement in the direction of Arrow Y2. The lid member 40 is then retained in the half-open position (FIG. 2(b)).

According to this embodiment, the mirror 43 is mounted on the rear side of the lid member 40, and in the half-open position of the lid member 40 the entire mirror is exposed to view underneath the storage member 30, so that the driver (not shown) can view the whole of the rear seats with this mirror 43.

In this state of the lid member 40, when the driver or the passenger pushes the press portion 45 of the lid member 40 by his finger, the lid member 40 rotates (moves upward) in the direction of Y1 of FIG. 4(b). During this event, as shown in FIG. 5(b), the pin 35a of the rocking pin 35 comes off from the upper hook $44a_1$ of the first guide member 44a and enters into the upper recess $44b_1$ of the second guide member 44b as shown by the broken line. The engagement between the upper hook $44a_1$ and the pin 35a is thereby disengaged.

When the driver or the passenger releases the finger from the press portion 45, the lid member 40 starts to rotate (move downward) in the direction Y2 of FIG. 4(b) by the urging force of the spring mechanism. During this event, as shown in FIG. 5(c), the pin 35a of the rocking pin 35 deviates from the intermediate passage 44c formed between the first and second guide members 44a, 44b. As the result, the lid member 40 continues to rotate (move downward) in the direction of Arrow Y2.

When the pin 35a of the rocking pin 35 comes into contact with the corner portion 41d formed on the side wall 41a of the lid member 40 as shown in FIG. 4(c), the rotation (downward movement) of the lid member 40 in the direction of Arrow Y2 is stopped in the full open position. In this state, the lid member 40 is fully open with the space K opened toward the rear side. Therefore, it is possible to stow or take out small articles into or from the space K as shown in FIG. 2(c).

In this event, the bucket member 42 of the lid member 40 functions as stopper means for preventing the stowed articles from falling down.

Next, when closing the lid member 40, the driver or the passenger operates as follows. The driver or the passenger puts his hand on the press portion 45 of the lid member 40 and pulls the lid member 40 to rotate (move upward) the lid member in the direction Y1 of FIG. 4(c). This causes the rocking pin 35 positioned away from the guide member 44 to be closer to the guide member 44, and as shown in FIG. 6(a), the pin 35a of the rocking pin 35 abuts against the upper outer end portion $44a_3$ of the first guide member 44a and thereafter starts to trace along the outer portion $44a_4$ of the first guide member 44a. When the lid member 40 is further rotated (moved upward) in the direction of Arrow Y1, the pin 35a of the rocking pin 35 traces along the outer portion $44a_4$ of the first guide member as illustrated by the chain double-dashed line of FIG. 6(a), and then comes off from the lower end $44a_5$ of the first guide member 44a as shown in FIG. 6(b) and engages with the recess $44b_3$ of the second guide member 44b. Therefore, the rotation of the lid member 40 in the direction of Arrow Y1 is stopped.

In this state, when the driver or the passenger releases his finger from the press portion 45 of the lid member 40, the lid member 40 rotates (moves downward) by the urging force of the spring mechanism in the direction Y2 of FIG. 6(b), so that the pin 35a of the rocking pin 35 is disengaged from the recess $44b_3$ of the second guide member 44b. Then, the pin 35a of the rocking pin 35 comes into engagement with the lower hook $44a_2$ of the first guide member 44a as shown in FIG. 4(a). Therefore, the lid member 40 returns to the original position (FIG. 2(a)) and is retained in the closed position.

According to this embodiment, the lid member 40 rotates in the above cycle. During the rotation the lid member 40 can be retained in the half-open position, the full open position, and the closed position, respectively.

In this overhead console assembly 10, the lid member 40 is constructed such that the mirror 43 mounted at the rear side thereof can be retained in a position halfway through the rotation of the lid member 40 where the mirror reflects to the driver to a view of the rear seats in the vehicle compartment. Therefore, by rotating and retaining the lid member 40 to this position (half open state) it is possible to view the rear seats in the vehicle compartment with the mirror 43.

Further, the rotating operation of the lid member 40 can be made only by pushing the press portion 45 of the lid member 40. Moreover, the lid member 40 can be retained in the predetermined state (half-open position) by this pushing operation only. This makes it possible to view the rear seats by using the mirror 43 and without requiring any complicated operations.

The overhead console assembly 10 according to this embodiment is convenient because (a) stowing and taking out small articles into and from the storage member 30 and (b) viewing the rear seats by using the mirror 43 of the lid member 40 can be carried out in a series of simple operations.

As best seen in FIGS. 2(a) and 2(b), according to this preferred embodiment, the overhead console assembly 10 is arranged at the front part F of the interior roof R and at the mid position along the vehicle width direction, which enables the mirror 43 to reflect to the driver to a view of the whole rear seats. Further, because the mirror 43 is a convex mirror, it is possible to provide an overhead console assembly 10, which reflects a wide range of view of the rear seats and which is easy to use.

Employing the convex mirror as the mirror 43 allows the passenger in the front passenger seat as well to view the rear seats by using the mirror 43.

Although the present invention has been described above with reference to a specific embodiment thereof, it is to be understood that various changes and modifications may be made without departing from the scope of the invention.

For example, the mirror 43 is not limited to the convex mirror and may be other types of mirrors having a lens function or a concave mirror. The mirror 43 may be detachable from the lid member 40. In this instance, the above types of mirrors and concave mirror may be prepared as option parts, so that the driver replaces the mirror according to his preference or application purposes.

According to this preferred embodiment, the lid member 40 opens for two stage adjustment. However, it is possible to provide a lid member with more than three stage adjustment (multistage open/close adjustment) by changing the shape of the guide member 44 so that the pin 35 of the rocking pin 35 can be retained by the guide member 44 at a plurality of positions.

What is claimed is:

1. An overhead console assembly comprising:
   a storage member positioned at a front of an interior roof within a vehicle compartment and having an opening which faces downwards;
   a lid member rotatably supported by the storage member for opening and closing the opening of the storage member so that a rear side thereof appears from and retracts into the storage member;
   a mirror provided on the lid member at a position where the rear side of the lid member appears to view; and
   retaining means retaining the lid member in a position halfway through the rotation of the lid member where the mirror reflects view of rear seats in the vehicle compartment.

2. An overhead console assembly according to claim 1, wherein the mirror is a convex mirror.

3. An overhead console assembly comprising:
   a storage member positioned at a front of an interior roof within a vehicle compartment and having an storage space which faces downwards and into which small articles can be stowed;
   a lid member having a rear wall and rotatably supported by the storage member such that the rear wall can be retracted when the lid member closes the storage space of the storage member, and the rear wall can be exposed to view when the lid member is open;
   a mirror mounted on the rear wall of the lid member; and
   retaining means retaining the lid member at least in a closed position where the lid member closes the storage space, a half-open position where the mirror is exposed to view for reflecting to a driver to a view of rear seats, and a full open position where the lid member is fully open to stow small articles.

4. An overhead console apparatus according to claim 3, wherein the mirror is a convex mirror.

* * * * *